United States Patent Office 3,140,151
Patented July 7, 1964

3,140,151
METHOD OF REPROCESSING $UO_2$ REACTOR FUEL
James R. Foltz, Canoga Park, Weldon J. Gardner, Van Nuys, and Sydney Strausberg, Woodland Hills, Calif., assignors, by mesne assignments, to the United States of America as represented by the United States Atomic Energy Commission
No Drawing. Filed Nov. 12, 1959, Ser. No. 852,234
13 Claims. (Cl. 23—14.5)

Our invention relates to a method of reprocessing uranium oxide reactor fuel, and more particularly to a nonaqueous, relatively low decontamination method of treating irradiated $UO_2$ for reuse in a reactor.

Uranium dioxide is currently in wide use as a nuclear reactor fuel. The advantages of uranium dioxide include its high melting point, stability at high temperatures, high corrosion resistance, and high permissible burnup. The duration of a reactor fuel cycle is limited by the build-up of neutron poisons (fission products), decrease in reactivity due to depletion of fissile isotopes, and dimensional instability of the fuel. Although high burnups can be achieved using slightly enriched $UO_2$, the spent fuel still contains sufficient fissile material to warrant reprocessing.

Reprocessing of $UO_2$ by present aqueous chemical methods has drawbacks for a commercial power reactor because (1) a large fuel inventory is required, (2) costs are high due to the processing charges for small amounts of fuel or shipping costs to a processing center, and (3) large amounts of liquid waste (requiring expensive storage) are generated. Furthermore, $UO_2$ in the form discharged from a reactor, is highly sintered or fused, glassy, extremely hard, and difficultly soluble even in hot, concentrated mineral acids.

Aqueous processing methods also require "cooling" (storing) of discharged reactor fuel for about 90 days before start of reprocessing, due in part to short-lived fission products of very high activity, such as xenon, iodine and krypton. These activities are released in the dissolving step in a highly non-manageable form, and create severe difficulties in scrubbing of dissolver off-gases prior to release up a stack to the environment. Pulverization of fused $UO_2$ and removal of such activities in a head-end step to a solvent extraction process would permit treatment of short-cooled material, and achieve economies by shortened cooling time. Another fission product difficult to remove by solvent extraction is ruthenium, which can exist in a number of valence states. Prior removal of ruthenium would be extremely useful. In summary, it can be seen that the development of an economical fuel reprocessing cycle for $UO_2$ can contribute significantly toward reducing the cost of nuclear power.

A reprocessing system for power reactor fuel should be adaptable to rapid refabrication of short-cooled fuel in order to reduce inventory, be economical in handling relatively small amounts of fuel, and provide useful fuel for recycle to the reactor. Fission products must eventually be removed, although high decontamination on each fuel cycle is not required. The reason why high recontamination is not necessary can be appreciated when it is noted that approximately 75–80% of neutron absorptions by fission products is by xenon and samarium, which build up to equilibrium rapidly in power reactors. Thus, even with complete decontamination, the effective fission product buildup occurs rapidly again. Reenrichment of the fuel is also required before fuel elements can be reconstituted.

It is, accordingly, an object of our invention to provide an improved method of reprocessing $UO_2$ reactor fuel.

Another object is to provide a method of pulverizing hard, fused, fission product-contaminated $UO_2$ bodies by non-mechanical methods.

Another object of our invention is to provide a dry, non-aqueous method of reprocessing irradiated $UO_2$.

Another object is to provide such a method of partially decontaminating irradiated $UO_2$ reactor fuel.

Still another object is to provide such a method for partially decontaminating and pulverizing highly sintered, ceramic $UO_2$ reactor fuel in a relatively simple and economical process.

Still another object of our invention is to provide a head-end treatment of irradiated $UO_2$ for an aqueous solvent extraction decontamination process.

Yet another object is to provide such a head-end treatment which pulverizes highly sintered $UO_2$ and removes iodine, krypton, xenon and ruthenium.

Further objects and advantages of our invention will become apparent from the following detailed description.

In accordance with our present invention refractory, irradiated $UO_2$ bodies may be pulverized and decontaminated by at least one oxidation-reduction cycle, each said cycle comprising oxidizing $UO_2$ to $U_3O_8$ and then reducing the resulting $U_3O_8$ to $UO_2$ with hydrogen. We find that the oxidation of the initial, contaminated ceramic $UO_2$ body results in its pulverization. Thus, a material which is only difficulty soluble in hot acids and is not amenable to mechanical pulverization in a hot cell, is remarkably readily decomposed by the formation of the higher oxide. A highly pulverized form of the oxide is desirable to facilitate blending and re-enrichment with fresh $UO_2$, and improves sintering characteristics which are advantageous in the refabrication of $UO_2$ fuel pellets. The pulverization is also an excellent head-end treatment for a solvent extraction cycle, since it removes the notorious iodine, xenon, krypton, and ruthenium in a small, easily managed volume, and further because the pulverized $UO_2$ may then be readily dissolved in aqueous acids for introduction into extraction columns.

$UO_2$ powders, not containing fission products, have heretofore been oxidized and reduced under different conditions for improving their reactivity to hydrofluorination, but our method of processing deals instead with contaminated, solid, ceramic material in a highly sintered or fused form, and uses different processing steps and conditions, as will be described in the following pages.

The degree of pulverization and decontamination achieved in the oxidizing step is a function of the temperatures and oxidizing medium employed, and the number of cycles. We have found that better pulverization is achieved at relatively lower temperatures employing ordinary air as the oxidizing medium, while better decontamination is obtained, although with coarser particles, at relatively higher temperatures in air. Pulverization occurs predominantly in the oxidation step, and repeated cycles increases comminution. In a multicycle process, alternate runs may be designed for both optimum decontamination and pulverization; the final runs would be at the milder conditions for pulverization. Where relatively less decontamination is required, all the cycles may be at the milder conditions.

Examining now the pulverization methods, a satisfactory temperature range for initially decomposing ceramic, neutron-irradiated $UO_2$ reactor fuel bodies is approximately 300–500° C. While satisfactory, indeed very good, pulverization may be obtained at about 300° C., the reaction rate is relatively slower. At a temperature in the region of 500° C. the reaction rate is faster but the particle size obtained is not as fine. The preferred temperature range for initial decomposition of fused $UO_2$, which gives an excellent balance between reaction rate and particle size, is 375° C. $\mp$ 20° C.

In recycle following initial pulverization, the oxidation temperatures should be reduced, since the quality of the powder after pulverization is quite sensitive to oxidation temperature. If the temperature during recycle is too high, say above 400° C., the exothermic oxidation of $UO_2$ powders becomes highly energetic, the temperature of the system sharply rises, and particle agglomeration results. It is, therefore, desirable to reduce the temperature of successive cycles as finer particles of greater reaction surface area are obtained. Thus, the oxidation temperature of each successive cycle may be satisfactorily lower than during the preceding cycle, down to a minimum of about 70° C. The temperature during recycle may thus suitably range between about 70–400° C., and generally will be in the range of about 100–250° C. with the oxidation temperature being reduced between each cycle by about 30–70° C. While partially incomplete oxidation may occasionally result in any given run under very mild conditions, this is not serious because of the number of runs, and is preferable to agglomeration.

Although the oxidizing gas may be either oxygen or air for chemical pulverization at the above temperatures, we find that better results are obtained with ordinary air. The reaction rate with oxygen is faster, and in repeated cycles, as the $UO_2$ becomes more comminuted, rapid ignition may occur, leading to coarser particles. However, oxygen may be employed, with satisfactory pulverization, with a low oxygen flow rate and pressure. The pressure should be below about 160 mm. mercury absolute (the partial pressure of oxygen in air), and preferably at pressures down to as low as about 2 mm. mercury.

The advantage of air over oxygen appears to be that the nitrogen is a dilutent which slows the reaction and removes heat. We have found, further, that superior $UO_2$ pellet comminution is obtained using air oxidation versus oxygen at the equivalent partial oxygen pressure (160 mm. mercury). Though the percent conversion to the $U_3O_8$ was high (93%), pulverization was inferior to that resulting from air oxidation, under similar conditions. It is apparent that extensive oxidation to $U_3O_8$ is, in itself, not the only requirement for maximum comminution. Observations indicated that instead of the gradual, controlled disintegration of $UO_2$ pellets which occurs in air, the charge ignited at 375° C. and burned rapidly (with large temperature rises) resulting in a coarser product.

The time required for completion of the oxidation to $U_3O_8$ depends on several factors, including the size of the $UO_2$ particles, the temperature of the system, and the oxidizing medium (air or oxygen). Using air under the preferred milder oxidation conditions, we find that complete oxidation is achieved generally in about 3–4 hours. However, for the first pulverization of the solid $UO_2$, reaction time is generally greater and runs between about 5–9 hours. Completion of the oxidation, which is the controlling factor rather than any specific times, can be determined by change in color, and can also be determined or confirmed by the absence of heat of reaction, as indicated on a suitable recorder.

The decontamination procedure is more efficient at a higher temperature and one or more such cycles may be interspersed with oxidation-reduction cycles under milder conditions for improved comminution. The temperature may satisfactorily range between approximately 600–1200° C. Some decontamination also occurs at lower temperatures as part of the chemical pulverization treatment, but not to the same extent. Better decontamination is obtained at the higher temperatures, but this must be balanced against possible loss of some product. The use of air rather than oxygen does not appear to affect the degree of decontamination obtained, but the reaction is more controllable with air, and its use is accordingly preferred. Oxidation under the above conditions removes most of the xenon, iodine, cesium, ruthenium, tellurium, and krypton. The decontamination achieved with respect to rare earths is not significant. Since the reaction is normally conducted in a relatively small reaction vessel, the fission product gases can be readily bled off into a small volume container for storage.

Decontamination factors of 2–5 are achieved with cesium and tellurium at low temperature, while at 1200° C. decontamination factors of 16–26 are obtained with respect to cesium and tellurium. No plutonium is removed below 900° C., while at about 1200° C. 50% of the plutonium is volatilized. When the decontamination step is incorporated into a plurality of oxidation-reduction cycles, it is generally not necessary to have more than approximately one or two such runs for decontamination purposes, although, of course, further runs may be made to achieve incrementally smaller additional decontamination.

After the oxidation treatment, the resulting product is in the form of comminuted $U_3O_8$ and reduction of this comminuted powder to $UO_2$ may be conducted either by thermal decomposition at elevated temperatures (approximately 1100–1300° C.) under vacuum, or by treatment with hydrogen at relatively lower temperatures. A smaller percentage of fine powder is obtained by thermal decomposition than by hydrogen treatment. In addition to coarser material, higher temperatures and vacuum tight equipment must be employed, and this overcomes the advantages in the elimination of hydrogen and water removal problems with hydrogen reduction.

The hydrogen reduction is usually conducted by first evacuating the furnace containing the $U_3O_8$ powder, heating the powder to operating temperature, and then introducing hydrogen into the bed of powder. The exothermic hydrogen reduction for material oxidized at either the milder or more vigorous conditions is the same. A satisfactory temperature range for the first hydrogen reduction is between approximately 500–800° C. while a convenient and effective temperature range, which we prefer, is about 650° C.±50° C. Under these conditions, uranium dioxide powder with an O—U ratio approaching stoichiometric 2.0 is obtained. Reduction with either static hydrogen or at low flow rates, for example, 2–4 standard cubic feet hydrogen per hour, is satisfactory, while flowing hydrogen at about one atmosphere through the $U_3O_8$ bed is preferred. The reduction time may satisfactorily vary between about 4–8 hours, with about 5–6 hours being preferred. Reduction is complete when the color of the powder changes to light brown and an outlet condensate line in a furnace appears dry, indicating no further production of the water reaction product

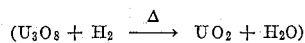

$$(U_3O_8 + H_2 \xrightarrow{\Delta} UO_2 + H_2O)$$

The reproducibility of the reduction step is excellent and at least 95.5% of the $UO_2$ product will pass a 400 mesh screen.

For subsequent reductions of $U_3O_8$ during recycle, the reduction temperature may be satisfactorily lowered, since the $U_3O_8$ is then of greater surface area. However, the reduction temperature, while affecting the quality of the $UO_2$ product, is not as sensitive as the oxidation temperature. It appears that the resulting water vapor and hydrogen dissipates heat of reaction to prevent agglomeration, and the reaction is not as strongly exothermic as the oxidation. Furthermore, it is important to achieve complete reduction in each cycle, where it is less important to achieve complete oxidation. We find, accordingly, that a satisfactory temperature range for recycle reduction is about 250–500° C., while about 400° C. is preferred, for about 5–6 hours.

Excellent pulverization and decontamination of sintered $UO_2$ fuel is obtained even in one oxidation-reduction cycle. Material thus treated may be then blended with enriched, fresh $UO_2$ and sintered for preparation of new fuel pellets. One cycle also provides a very satisfactory head-end treatment for aqueous reprocessing, eliminating gaseous fission products and preparing $UO_2$ or $U_3O_8$ for easy dissolution. However, we find that a plurality of such cycles achieves even higher quality, finer particle material for immediate return to a reactor. Beyond about five cycles the powders are of such fine size (e.g. <5 microns)

that they may be pyrophoric. Therefore, more than five cycles is generally not required, and about 4–5 cycles is optimum. When a high temperature oxidation step is inserted as one of the cycles, it should be conducted relatively early in the sequence. The first cycle, however, should still be for pulverization, since comminuted $UO_2$ lends itself to more efficient decontamination. In any event, the last few cycles should be under the milder oxidizing conditions.

In a preferred form of our invention, ceramic, neutron-irradiated $UO_2$ may be reprocessed by conducting approximately five oxidation-reduction cycles, the first such cycle comprising oxidizing $UO_2$ at a temperature of approximately 350° C.±20° in static air, the remaining cycles being at successively lower temperatures between about 100–250° C. The resulting $U_3O_8$ is reduced after the first oxidation step with slowly flowing hydrogen at a temperature of about 650° C.±50° for about five to six hours until $UO_2$ powder is obtained. In subsequent reductions, the reduction temperature is about 400° C. for improved decontamination with respect to fission products, the second cycle in the above sequence has its oxidation step conducted at a temperature of about 900° C. in air.

The following examples and data are offered to illustrate our invention in greater detail.

The process steps were conducted in an induction furnace having a 6″ diameter, fused silica tube envelope. A 24 turn induction coil surrounded the silica tube, and 20 to 30 kc. power was provided by a frequency converter. The electrical susceptor for the induction system was a 4″ I.D. nickel bucket. The nickel bucket contained the alumina crucible. A grid arrangement was also employed which permitted the oxidized powder from a pellet to drop away, allowing the pellet core to be fully exposed to the reaction gas. The charge in the crucible was heated indirectly by the induction coil through the nickel susceptor. Temperatures were measured either by an optical pyrometer (above 760° C.), or by a chromel-alumel thermocouple suitably protected from the $H_2$, such as by a stainless steel sheath, and placed on the supports for the pellets used in conjunction with a potentiometer. In each cycle, prior to the introduction of fresh gas, the furnace chamber was evacuated (to less than one mm. of mercury), purged with inert gas, and then re-evacuated. In those operations using low gas flow, the flow of gas through the furnace chamber was upward, through the fine wire screen which supported the pellets and ultimately the powder bath.

The first runs tabulated below were with ten $O_2$—$H_2$ cycles, at 800° C., using about five grams of $UO_2$ pellets fused by means of electrical resistance heating. After the initial ten cycles, the −400 mesh fines were removed and the +400 material reprocessed for an additional ten cycles. Comparison of this data with the next set data below shows that under the relatively severe oxidation conditions, only about one-half of the material was pulverized to −400 mesh fines.

TABLE I

| Mesh Size | First Treatment (wt. percent) | Recycle of +400 (wt. percent) | Overall Comminution Including Original −400 Material (wt. percent) |
|---|---|---|---|
| +10 | 1.5 | 6.7 | 5.0 |
| −10 +20 | 0.4 | 1.2 | 0.9 |
| −20 +40 | 4.3 | 1.7 | 1.3 |
| −40 +100 | 31.0 | 12.8 | 9.5 |
| −100 +200 | 23.4 | 16.2 | 12.1 |
| −200 +400 | 14.0 | 14.2 | 10.6 |
| −400 | 25.3 | 47.2 | 60.7 |
| | 99.9 | 100.0 | 100.1 |

The next set of runs vertified the advantages of low temperature and/or low flow, low pressure, oxygen operation. These runs showed that lower temperature provides finer comminution. It also indicates that for the same temperature and time of reaction (700° C. runs), low pressure (1 mm. Hg absolute pressure) resulted in more effective pulverization.

TABLE II

| | | | |
|---|---|---|---|
| Temperature, °C | 520 | 700 | 700 |
| $O_2$ Flow, scfh | Static | Static | 2.2 |
| Oxidation Time, hr | 1 | 6 | |
| Pressure, mm. Hg abs | 680 | 680 | |
| | Weight Percent | | |
| Mesh size: | | | |
| +10 | 0 | 1.4 | 0 |
| −10 +20 | 2.3 | 2.5 | 0.6 |
| −20 +40 | 3.8 | 5.7 | 2.6 |
| −40 +100 | 8.9 | 26.8 | 16.9 |
| −100 +200 | 7.0 | 31.8 | 15.9 |
| −200 +400 | 12.5 | 15.8 | 16.6 |
| −400 | 65.5 | 16.0 | 47.4 |
| | 100.0 | 100.1 | 100.0 |
| Percent $U_3O_8$ (calculated) | 100 | 100 | 98 |

The following run, in which 95.7% of the material passed a −400 screen, clearly establishes the superiority of air oxidation at milder conditions. The temperature was first slowly increased to about 300° C. in about 45 minutes; the temperature was then raised to 375–410° C. for a period of another 75 minutes. There was no rapid ignition noted (as was generally observed with $O_2$ attack), but rather a slow crumbling effect until the entire pellet appeared pulverized. The screen analysis, noted in Table III below, indicated excellent comminution.

TABLE III

| Mesh size: | | Wt. percent |
|---|---|---|
| +10 | | 0 |
| −10 | +20 | 0 |
| −20 | +40 | 0.3 |
| −40 | +100 | 0.7 |
| −100 | +200 | 0.8 |
| −200 | +400 | 2.5 |
| | −400 | 95.7 |
| | | 100.0 |

The following runs compared air oxidation with oxygen oxidation at equivalent partial pressures of oxygen, and also the effects of temperature with air oxidation. It will be noted that at the same temperature (375° C.), air oxidation was superior to oxygen at the equivalent partial oxygen pressure, and that milder oxidation produced finer material.

TABLE IV

| Temperature, °C | 375 | 520 | 305 | 375 |
|---|---|---|---|---|
| Oxidation Time, hr | 2 | 1 | 3 | 2 |
| Oxidizing Medium | [1] Air | [1] Air | [1] Air | [2] $O_2$ |
| | Weight Percent | | | |
| Mesh Size: | | | | |
| +10 | 0 | 12.0 | 7.5 | 0.1 |
| −10 +20 | 0 | 2.1 | 4.2 | 0.4 |
| −20 +40 | 0 | 0.8 | 1.7 | 0.6 |
| −40 +100 | 0 | 0.7 | 1.4 | 2.4 |
| −100 +200 | 0.3 | 5.0 | 0.8 | 5.9 |
| −200 +400 | 4.4 | 8.4 | 3.7 | 9.4 |
| −400 | 95.2 | 71.1 | 80.6 | 81.2 |
| | 99.9 | 100.1 | 99.9 | 100.0 |
| Percent $U_3O_8$ (Calculated) | 91 | 80 | 78 | 93 |

[1] 1 atm.  [2] 160 mm. Hg.

Considering now examples of the reduction steps, the first information tabulated below is the reduction of $U_3O_8$ powder by thermal decomposition. It is noted that only about 50% of the material was reduced to $UO_2$ powder of −400 mesh.

TABLE V

|  | Oxidation | Reduction | |
|---|---|---|---|
| Pressure | 1 atm. | 5 Microns Hg or Less Vacuum | |
| Medium | Air | | |
| Temperature, °C | 375 | 1,100 | 1,215 |
| Time at Temp., hr | 2½ | 1 | 1 |
|  | Weight Percent | | |
| Mesh Size: | | | |
| +10 | } [1]1 | 0.1 | 2.0 |
| −10 +20 | | 1.3 | 4.2 |
| −20 +40 | | 4.6 | 7.8 |
| −40 +100 | } 3–5 | 22.8 | 16.0 |
| −100 +200 | | 10.1 | 5.4 |
| −200 +400 | | 8.3 | 5.4 |
| −400 | [2]95 | 52.8 | 59.2 |
|  | | 100.0 | 100.0 |
| O/U Ratio, Calculated | 2.6 | 2.27 | 2.0 |

[1] Less than.   [2] About.

The next set of data established the operating conditions for reduction with hydrogen. In each run the oxidized particle was not removed from the furnace between the oxidation and reduction steps. The hydrogen gas flow was upward through the bed of powder. The gas flows were low enough to prevent the loss of any powder. After the oxidation step, the furnace was evacuated and the powder heated to the operating temperature, then exposed to the flow of hydrogen at various conditions, as noted in Table VI below. In comparison with the thermal decomposition, it is noted that at least 95% of the resulting $UO_2$ was −400 mesh.

TABLE VI

|  | Oxidation Step | Reduction Step | | |
|---|---|---|---|---|
| Pressure (abs.) | 1 atm. | [1]25 H₂ | [1]15 H₂ | 1 atm. H₂ |
| Medium | Air | | | |
| Temp., °C | 375° | 590–725 | 650 | 650 |
| Flow, scfh | Static | Static | 2.3 | 2.3 |
| Time at temp. (hr.) | 2½–3 | 2½ | 3½ | 2½ |
| Mesh Size: | Weight Percent | | | |
| +50 | [2]1.5 | 0.12 | 0.05 | 0.33 |
| −50 +400 | 3–4 | 3.96 | 2.88 | 4.05 |
| −400 | 95–97 | 95.90 | 97.03 | 95.60 |
|  | | 99.98 | 99.96 | 99.98 |
| O/U Ratio (Calculated) | 2.6 | 2.06 | 2.02 | 2.05 |

[1] In. Hg.   [2] Less than.

The following examples relate to decontamination runs. The uranium dioxide employed was irradiated in the Materials Testing Reactor to an integrated flux of $8 \times 10^{18}$ nvt. The oxide was cooled approximately 6 months prior to use in these experiments. A radiochemical analysis of the fission products is shown below.

TABLE VII

Radiochemical Analysis of Uranium Oxide

| Analysis: | Concentration—c./min./gm. $UO_2$ |
|---|---|
| Total activity | $2.7 \times 10^8$. |
| Cerium | $1.5 \times 10^8$. |
| Cesium | $5.9 \times 10^7$. |
| Rare earths | $2.1 \times 10^8$. |
| Ruthenium | $3.6 \times 10^6$. |
| Strontium | $1.5 \times 10^8$. |
| Tellurium | $3.6 \times 10^6$. |
| Zirconium | $8.5 \times 10^7$. |
| Plutonium | $18.0 \times 10^5$ d./min./gm. $UO_2$ (13 micro gm./gm. $UO_2$). |

The oxidation steps were conducted with pure oxygen at atmospheric pressure. The experimental conditions for these runs are noted in the table below.

TABLE VIII

Experimental Conditions—Oxidation-Reduction

| Run | Number Cycles | Time of Each Gas Treatment, Minutes | Oxidation Temperature, °C | Reduction Temperature, °C |
|---|---|---|---|---|
| 1 | 2 | 60 | 600 | 900 |
| 2 | 4 | 15 | 600 | 900 |
|  | 1 | 15 | 1,250 | 1,250 |
| 3 | 10 | 15 | 600 | 600 |
| 4 | 1 | 10 | 600 | 900 |

A radiochemical analysis was made of the resulting $UO_2$. The decontamination obtained is shown in Table IX.

TABLE IX

Radio-Chemical Results—Oxidation-Reduction

| No. Cycles | Oxidation Temp., °C | Reduction Temp., °C | Weight Loss Percent | Decontamination Factor | | | | | | | |
|---|---|---|---|---|---|---|---|---|---|---|---|
|  |  |  |  | Total Activity | Ce | Cs | Pu | Rare Earth | Ru | Sr | Te | Zr |
| 2 | 600 | 900 | 0.3 | 1.0 | 1.1 | 3.8 | 1.2 | 1.1 | 7 | 1.1 | 5 | 0.9 |
| 4 | 600 | 900 | 0.2 | 1.0 | 1.0 | 3.7 | 1.0 | 0.9 | 11 | 1.0 | 5 | 7±1 |
| 4 | 600 | 900 | } 0.1 | 1.0 | 1.1 | 16 | 2.1 | 0.9 | 13 | 1.0 | 26 | 1.3 |
| 1 | 1,250 | 1,250 | | | | | | | | | | |
| 10 | 600 | 600 | | 1.0 | 0.9 | 1.9 | 1.0 | 0.9 | 16 | 1.0 | 4 | 1.6 |

It is noted that substantial cesium, tellurium and ruthenium decontamination occurred. Considerable plutonium decontamination occurred at 1250° C. No substantial cerium, strontium, zirconium, or rare earth decontamination was obtained.

The following runs were made with relatively larger samples of $UO_2$ and were multicycle. The oxidation-reduction runs were conducted in a commercial, vacuum melting furnace. The size of the unit, approximately 50 ft.³ interior capacity, provided sufficient volume for 5 pound experiments, since local changes in gas concentration due to chemical reactions with the $UO_2$ would be relatively minor. The uranium dioxide charge was contained in a portable, triple basket assembly, the baskets being composed of 16 mesh stainless steel. After the charge was loaded into each of the baskets thermocouples were arranged therein. The entire assembly was loaded into the furnace as a unit, and was suspended from the top of an alumina cylinder. Top and bottom of the furnace were insulated to minimize temperature gradients. The completion of the oxidation reaction was determined both by visual observation and by temperature measurements of the powder bed. Completion of the reduction step was determined by a condensing apparatus; water formed during the reduction step was condensed, and then collected in a graduated cylinder. The reduction was considered complete when the production of water ceased.

The $UO_2$ in these multicycle runs contained "fissia." By "fissia" is meant stable isotopes of the fission elements which have been added to simulate irradiated $UO_2$. The concentration of the materials added, simulated a fuel burnup of 10,000 mwd./ton or 1% atom burnup. Some of the volatile fission products (such as Xe, Kr, I, Cs) and some of the rarer elements were neglected in making the fissia composition. The materials employed are shown in Table X.

TABLE X

| Fission Product | Fission Product Compound | P.p.m. of Compound |
|---|---|---|
| Mo | Mo | 1,100 |
| Zr | $ZrO_2$ | 1,600 |
| Ru | Ru | 620 |
| Ba | $BaCO_3$ | 979 |
| Nd | $Nd_2O_3$ | 1,150 |
| Ce | $CeO_2$ | 1,200 |
| La | $La_2O_3$ | 520 |
| Pr | $Pr_6O_{11}$ | 440 |
| Sm | $Sm_2O_3$ | 185 |
| Y | $Y_2O_3$ | 200 |
|   |   | *7,994 |

*Approximately 0.8%, by weight.

An oxidation-reduction pulverization run on sintered pellets of this material were conducted under the conditions and with the results indicated below.

was indicated. The experimental conditions and results are indicated below.

TABLE XII

| Form | Indicated O/U Ratio | Particle Size, Microns | Surface Area, m.²/gram | Indicated Reaction Temp., °C. | Bulk Tap Density, gms./cc. | Ratio of Tap Densities |
|---|---|---|---|---|---|---|
| $UO_2$ | 2.05 | 3.09 | 0.41 | 200-250 | 3.13 |  |
| $U_3O_8$ | 2.67 | 1.76 |  | ca. 400 | 2.17 | 0.79 |
| $UO_2$ | 2.00− | 1.58 | 1.05 | 130-160 | 2.74 |  |
| $U_3O_8$ | 2.67+ | 1.38 |  | ca. 400 | 1.89 | 0.77 |
| $UO_2$ | 2.00− | 1.12 | 1.51 | 90-100 | 2.47 |  |
| $U_3O_8$ | 2.65 | 0.93 |  | ca. 400 | 1.33 | 0.67 |
| $UO_2$ | 2.01 | 0.77 |  | 60-70 | 2.00 |  |
| $U_3O_8$ | 2.67+ | 0.68 |  | ca. 400 | 1.02 | 0.81 |
| $UO_2$ | 2.01 | 0.62 |  |  | 1.26 |  |

Significant changes occurred in particle size and tap density values between the first and fifth cycles. The first reduced powder (formed from the pulverization of pellets) decreased to approximately one-fifth of its original measured particle size after four additional oxidation-reductions, while its tap density decreased to about two-fifths of its original value. Corresponding increases in surface area were also measured. The reduction of tap densities were calculated for a given cycle material; it can be seen that the values approached the theoretical ration of 0.76 for $U_3O_8/UO_2$.

The following run illustrates the improved sinterability of recycled $UO_2$ powder as compared with ordinary $UO_2$ powder. Good sinterability and high density is important for reactor use, for pellets of higher density offer several advantages, especially the ability to retain fission product gases. The pellets underwent sintering for twelve hours at 1800° C. The compacts were prepared with 2% carbowax binder.

TABLE XI

*Scaled-Up Pulverization Results on 1% Fissia Pellets*

| Run No. | D-77 | | | | D-79 | | | |
|---|---|---|---|---|---|---|---|---|
| Wt. of Pellets, Grams | 934 | | | | 2,485 | | | |
| Oxidizing Medium | Flowing Air, 1 atm. | | | | Flowing Air, 1 atm. | | | |
| Oxidation Time, @ Temp., hrs. | 4½ | | | | 8 | | | |
| Reducing Medium | Flowing $H_2$, 1 atm. | | | | Flowing $H_2$, 1 atm. | | | |
| Reduction Time, @ Temp., hrs. | 6 | | | | 10 | | | |
| Basket Position | Top | Mid | Bottom | Overall | Top | Mid | Bottom | Overall |
| Oxidation Temp., °C | 372 | 397 | 362 |  | 388 | 404 | 348 |  |
| Reduction Temp., °C | 685 | 690 | 640 |  | 678 | 691 | 588 |  |
| | Weight Percent | | | | | | | |
| Mesh Size: | | | | | | | | |
| +50 | 0 | 0 | 0 | 0 | 0.2 | 0.2 | 0.1 | 0.2 |
| −50 +400 | 12.3 | 18.4 | 14.7 | 15.4 | 6.8 | 18.5 | 13.1 | 12.8 |
| −400 | 87.8 | 81.4 | 85.2 | 84.5 | 93.0 | 81.3 | 86.7 | 87.0 |
| | 100.1 | 99.8 | 99.9 | 99.9 | 100.0 | 100.0 | 99.9 | 100.0 |

Following the pulverization, successive oxidation-reduction runs were made with the material of Table XI above. The batch charge was 1000 grams. Cycling was conducted just prior to the stage where a pyrophoric powder would have been obtained. The properties measured included O-U ratios, tap densities, and powders particle size. The oxidation steps were conducted in flowing air, at one atmosphere pressure, and at temperatures below 400° C. The charge was heated slowly at intervals, held at constant power to observe temperature rises, and the power increased only if no reaction

TABLE XIII

*Comparison of Results of Sintered Pellets Made From Original $UO_2$ Recycled by Oxidation-Reduction Treatment and From 5% Fissia*

| Identification | Original $UO_2$ | | Recycle $UO_2$ | |
|---|---|---|---|---|
| Average Particle Size, Microns | 3.43 | | 2.35 | |
| Compacting Pressure, TSI | 53.3 | 78.2 | 53.3 | 78.2 |
| No. Pellets | 4 | 4 | 4 | 4 |
| Percent Theoretical Density | 88.9 | 91.2 | 94.8 | 96.1 |
| $H_2O$ Displacement | 91.4 | 92.6 | 96.1 | 97.3 |
| Therotical Density, g./cc. | 10.97 | | 10.97 | |

The foregoing examples of our invention should be understood as being illustrative rather than restrictive. Employing our invention several modifications may be made by those skilled in the art for the reprocessing of solid, ceramic, irradiated $UO_2$ reactor fuel. Our invention, therefore, should be understood to be limited only as indicated in the appended claims.

We claim:

1. A method of reprocessing sintered, irradiated, $UO_2$ reactor fuel, which comprises subjecting said $UO_2$ to a plurality of cycles, the first cycle comprising oxidizing said $UO_2$ to $U_3O_8$ at a temperature of about 300–500° C., and reducing the resulting comminuted $U_3O_8$ to $UO_2$ with hydrogen at a temperature of about 500–800° C., the remaining said cycles comprising oxidizing the resulting comminuted $UO_2$ from the previous cycle to $U_3O_8$ in air at a temperature of about 100–250° C., and reducing the resulting $U_3O_8$ to $UO_2$ with hydrogen at a temperature of about 250–500° C.

2. A method of reprocessing sintered, irradiated, $UO_2$ reactor fuel, which comprises subjecting said $UO_2$ to a plurality of cycles, the first cycle comprising oxidizing said $UO_2$ to $U_3O_8$ in air at a temperature of about 375° C.$\mp$20° C. for about 5–9 hours, and then reducing the resulting comminuted $U_3O_8$ to $UO_2$ with hydrogen at a temperature of about 650° C.$\mp$50° C. for about 4–8 hours, the remaining said cycles comprising oxidizing the resulting $UO_2$ from the previous cycle to $U_3O_8$ in air at a temperature of about 100–250° C. for about 3–4 hours, and reducing the resulting $U_3O_8$ to $UO_2$ with hydrogen at a temperature of about 250–500° C. for about 5–6 hours.

3. A method of reprocessing sintered, irradiated, $UO_2$ reactor fuel, which comprises subjecting said $UO_2$ to a plurality of cycles, the first cycle comprising oxidizing said $UO_2$ to $U_3O_8$ in air at a temperature of about 300–500° C., and reducing the resulting comminuted $U_3O_8$ to $UO_2$ with hydrogen at a temperature of about 500–800° C., the remaining said cycles comprising oxidizing the resulting comminuted $UO_2$ from the previous cycle to $U_3O_8$ at a temperature of about 70–400° C., the temperature of the $UO_2$ oxidation step in each said remaining cycle being progressively lower than in the preceding cycle, and then reducing the resulting $U_3O_8$ to $UO_2$ with hydrogen at a temperature of about 250–500° C.

4. The method of claim 3 wherein said plurality of cycles comprises about 4–5 cycles.

5. A method of reprocessing sintered, irradiated $UO_2$ reactor fuel, which comprises subjecting said $UO_2$ to a plurality of cycles, the first cycle comprising oxidizing said $UO_2$ to $U_3O_8$ in air at a temperature of about 300–500° C., and reducing the resulting comminuted $U_3O_8$ to $UO_2$ with hydrogen at a temperature of about 500–800° C., the remaining said cycles comprising oxidizing the resulting comminuted $UO_2$ to $U_3O_8$ in air at a temperature of about 100–250° C., the oxidation temperature in each said remaining cycle, being progressively lower than in the preceding cycle, and then reducing the resulting $U_3O_8$ to $UO_2$ with hydrogen at a temperature of about 250–500° C.

6. A method of reprocessing sintered, irradiated, $UO_2$ reactor fuel which comprises subjecting said $UO_2$ to a plurality of cycles, the first said cycle comprising oxidizing said sintered $UO_2$ to $U_3O_8$ with air at a temperature of about 375° C.$\mp$20° C. for about 5–9 hours, and then reducing the resulting comminuted $U_3O_8$ with hydrogen at a temperature of about 650° C.$\mp$50° C. for about 4–8 hours, the remaining said cycles comprising oxidizing the resulting comminuted $UO_2$ to $U_3O_8$ in air at a temperature of about 100–250° C. for 3–4 hours, the oxidation temperature in each said remaining cycle being progressively lower than in the preceding cycle, and then reducing the resulting comminuted $U_3O_8$ to $UO_2$ with hydrogen at a temperature of about 250–500° C. for about 5–6 hours.

7. A method of reprocessing and partially decontaminating sintered, irradiated, $UO_2$ reactor fuel which comprises subjecting said $UO_2$ to a plurality of cycles, the first cycle comprising oxidizing said $UO_2$ to $U_3O_8$ at a temperature of about 300–500° C., and reducing the resulting $U_3O_8$ to $UO_2$ with hydrogen at a temperature of about 500–800° C.; and then, in at least one intermediate cycle in said plurality of cycles, oxidizing the $UO_2$ from a previous cycle to $U_3O_8$ at a temperature of at least about 600° C., and reducing the resulting $U_3O_8$ to $UO_2$ with hydrogen at a temperature of about 500–800° C.; the remaining said cycles comprising oxidizing the comminuted $UO_2$ to $U_3O_8$ at a temperature of about 70–400° C., and then reducing the resulting $U_3O_8$ to $UO_2$ with hydrogen at a temperature of about 250–500° C.

8. The method of claim 7 wherein said oxidation steps are conducted in air.

9. A method of reprocessing and partially decontaminating sintered, irradiated, $UO_2$ reactor fuel, which comprises subjecting said $UO_2$ to a plurality of cycles, the first said cycle comprising pulverizing said $UO_2$ by oxidation to $U_3O_8$ in air at a temperature of about 300–500° C. for about 5–9 hours, and then reducing the resulting comminuted $U_3O_8$ to $UO_2$ with hydrogen at a temperature of about 500–800° C.; and then, in an intermediate cycle in said plurality of cycles, oxidizing the resulting $UO_2$ from a previous cycle to $U_3O_8$ in air at a temperature of about 600–1200° C., and reducing the resulting $U_3O_8$ to $UO_2$ with hydrogen at a temperature of about 500–800° C. for about 4–8 hours; the remaining said cycles comprising oxidizing the $UO_2$ from the preceding cycle to $U_3O_8$ in air at a temperature of about 100–250° C., and reducing the resulting comminuted $U_3O_8$ to $UO_2$ with hydrogen at a temperature of 250–500° C.

10. The method of claim 9 wherein said plurality of cycles consists of 4–5 cycles.

11. The method of claim 9 wherein the oxidation step in each said remaining cycle is conducted at a progressively lower temperature than in the preceding oxidation.

12. The method of claim 9 wherein the oxidation step conducted at 600–1200° C. is the second cycle in said plurality of cycles.

13. A method of partially decontaminating and reprocessing sintered, irradiated $UO_2$ reactor fuel, which comprises subjecting said $UO_2$ to a plurality of cycles, the first cycle comprising oxidizing $UO_2$ to $U_3O_8$ in air at a temperature of about 375° C.$\mp$20° C. for about 5–9 hours, and then reducing the resulting comminuted $U_3O_8$ to $UO_2$ with hydrogen at a temperature of 650° C.$\mp$50° C. for about 4–8 hours; the second said cycle comprising oxidizing the resulting comminuted $UO_2$ from said first cycle to $U_3O_8$ in air at a temperature of about 600–1200° C., and reducing the resulting $U_3O_8$ to $UO_2$ with hydrogen at a temperature of about 500–800° C.; the remaining cycles comprising oxidizing the $UO_2$ from the previous cycle at a temperature of about 100–250° C. in air for about 3–4 hours, the oxidation temperature in each said remaining cycle being progressively lower than the temperature of the preceding oxidation, and then reducing the resulting comminuted $U_3O_8$ to $UO_2$ with hydrogen at a temperature of about 250–500° C. for about 5–6 hours.

References Cited in the file of this patent

UNITED STATES PATENTS 2,807,519     Polissar _____ Sept. 24, 1957

OTHER REFERENCES

Reactor Fuel Processing I, vol. I, No. 4, pp. 17 and 25, October 1958, which refers to AEC Document NAA–Sr–2750, dated June 10, 1958.

Reactor Fuel Processing II, vol. 2, No. 3, pp. 22, 23

(Other references on following page)

and 29, July 1959, which refers to AEC Document NAA-SR-2778, dated July 1958.

AEC Document LA-1952, pp. 9-25, 27-39, October 1955, declassified Aug. 15. 1957.

AEC Document NAA-SR-3910, pp. 7-9, 15-17, 19-21, 24, 24-46, Aug. 1, 1959.

Gronvold: "J. Inorg. and Nuclear Chem.," vol. 1, pp. 357-370 (1955), Pergamon Press, Ltd., London.

Johnson et al.: "Ceramic Bulletin," vol. 36, No. 3, pp. 112-117 (1957).

Hausner et al.: "Nucleonics," pp. 94-103 (July 1957).

Harrington et al.: "Uranium Production Technology," pp. 65-68, 113-116.